(12) United States Patent
Guddanti

(10) Patent No.: US 7,072,053 B2
(45) Date of Patent: Jul. 4, 2006

(54) SYSTEM AND METHOD FOR SAVING POWER USING PRIORITY PRINTING

(75) Inventor: Srinivas Guddanti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 382 days.

(21) Appl. No.: 10/611,072

(22) Filed: Jun. 30, 2003

(65) Prior Publication Data
US 2004/0105111 A1    Jun. 3, 2004

Related U.S. Application Data

(62) Division of application No. 10/109,925, filed on Mar. 29, 2002, now Pat. No. 6,883,980.

(51) Int. Cl.
*G06F 15/00* (2006.01)

(52) U.S. Cl. .................... 358/1.13; 358/1.15; 399/8; 399/9

(58) Field of Classification Search .......... 358/1.12, 358/1.13, 1.14, 1.15; 399/8, 9, 10
See application file for complete search history.

(56) References Cited

U.S. PATENT DOCUMENTS

| | | | |
|---|---|---|---|
| 6,753,973 B1 * | 6/2004 | Hashimoto et al. | 358/1.14 |
| 6,785,727 B1 * | 8/2004 | Yamazaki | 709/229 |
| 6,813,037 B1 * | 11/2004 | Collard | 358/1.15 |
| 6,920,295 B1 * | 7/2005 | Yoshimura et al. | 399/81 |

* cited by examiner

*Primary Examiner*—Mark Wallerson

(57) ABSTRACT

The present invention discloses a method and apparatus for saving power in a printing system, by prioritizing printer jobs. Using a graphical user interface an end-user assigns a print time to a first job. The print time designation is attached to the first job and the first job is transmitted from the end-user station to a printer. Based on whether the printer is in ready state or in power save mode the first job is printed immediately or stored in memory. When the first job is stored in memory, computations are made to determine a printing time to initiate printing of the first job. The first job is then printed at the printing time or at an earlier printing time if a second job with an earlier printing time is stored in the memory.

27 Claims, 4 Drawing Sheets

SYSTEM AND METHOD FOR SAVING POWER USING PRIORITY PRINTING

CROSS REFERENCE TO RELATED APPLICATION

This is a divisional of application Ser. No. 10/109,925 filed on Mar. 29, 2002, now U.S. Pat. No. 6,883,980, which is hereby incorporated by reference herein.

BACKGROUND OF THE INVENTION

1. Field of Invention

This invention relates to printing. Specifically, the present invention relates to power savings.

2. Description of the Related Art

In modern computing environments computers are networked to share resources. For example, several computers may be networked to share the same server. The server may house resources used by each computer, such as a database or specific programs.

Sharing these resources provides for efficiencies in the network. For example, if a database is stored on one server there is no need to replicate the database information on each machine that uses the information. As a result, the amount of hardware required in the network is greatly reduced. With less hardware, tangential savings are also achieved such as power savings, since an end-user has to run fewer machines. Running fewer machines ultimately results in financial savings.

In addition to computing devices, peripheral devices in the network are also shared. For example, conventional printers are often networked and shared by several end-users. As with computing devices, using a network printer results in end-user efficiencies, since several end-user stations share the same printer. Ultimately, this results in a savings in hardware, power and space resources required to run and house the printer. Across a large organization, this savings can be substantial.

Although sharing network printers provide efficiencies, in many ways conventional network printers still function in an inefficient manner. For example, conventional network printers operate in a power save mode when they are not in operation. In power save mode the printer runs on less power, when the printer is not printing or processing a job. When a network printer receives a print job, the printer comes out of power save mode and begins to print the job. When several jobs arrive at a network printer the jobs are printed as they are received by the printer.

If the printer is in power save mode, the printer will begin to print the first job. The printer will then place each additional job that arrives in a print queue and sequentially print the jobs from the queue. In other words a first in—first out (FIFO) algorithm is used. There is no prioritization of the jobs. With the random arrival of jobs, a conventional network printer is often cycling between operating mode and power save mode. Cycling back and forth, stops the printer from maximizing the full benefit of the power save mode. In addition, without any prioritization of jobs, end-users have limited control over how or when their jobs are printed.

There is a need in the art for a more efficient system or method for sharing a printing resource. For example, there is a need for a shared printer resource that will maximize the use of the power save mode feature. There is a need for a shared printer resource that enables the prioritization of jobs.

Lastly, there is a need in the art, for shared printer resource that gives an end-user more control over how and when a print job is processed.

SUMMARY OF THE INVENTION

The need in the art is addressed by the method and apparatus for strategic printing of the present invention. In accordance with present teachings, a shared printer in power save mode receives a job for printing and switches from power save mode to a ready state. In the ready state, the printer prints jobs based on the length of the job and a priority code associated with the job. The priority code is used to look up the delay time before the printer prints the job. The delay time in conjunction with the length of the job information is then used to compute the printing time for the job. When the delay time is less than the printing time the job is printed.

In an alternate embodiment of the present invention a printer in the power save mode receives a first print job that includes information on the length of the job information and priority code information. The printer once again calculates the printing time and if it is not time for printing, stores the print job in memory. When the printer receives a second print job with higher priority code information, the printer prints all the jobs stored in memory when it is time to print the second print job with the higher priority code information. In a third embodiment, if there are several print jobs in memory, the printer will print all of the jobs in memory regardless of their priority code when the first print job stored in the memory is ready for printing. Finally, in a fourth embodiment of the present invention, the printer is in the ready state, so the job is printed irrespective of the priority code.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
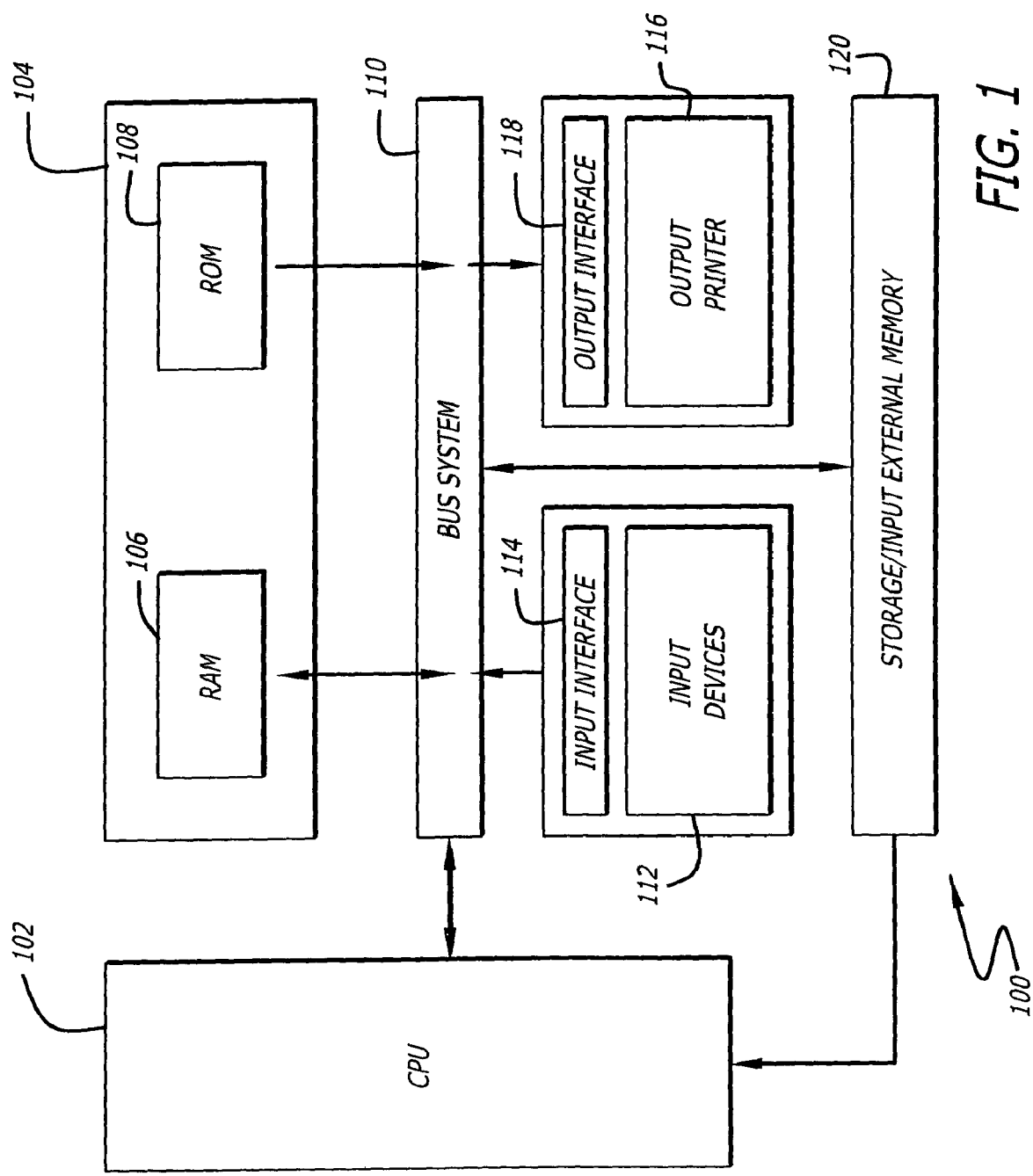
FIG. 1 is a system diagram of the present invention.

FIG. 1 is a block diagram of an illustrative embodiment of a system implemented in accordance with the teachings of the present invention. As shown in FIG. 1, the system 100 includes a central processing unit (CPU) 102. Internal memory 104 is included which provides random access memory 106 for staging information and a read only memory 108 for storing computer instructions. The CPU 102 accesses information in the RAM 106 and the ROM 108 through a standardized communication pathway or a bus 110. Input devices such as a keyboard, a mouse, a joy stick, a scanner and a light pen are also shown as 112. Communication between the input device 112 and other parts of the system, is accomplished through an input interface 114 and the bus 110. Output devices include a monitor (not shown) and a printer 116. Communication between the output devices and other parts of the system, is accomplished through the bus 110 and an output interface 118. External memory 120 is also shown. External memory 120 may include a floppy disk drive, a hard disk drive, a CD ROM or a magnetic tape.

In accordance with an illustrative embodiment of the method of the invention, a number of print jobs may arrive at the printer and be stored in a queue, in internal memory 104 or external memory 120. Computer instructions for processing the print jobs in accordance with the present invention are stored in internal memory 104 (e.g. ROM 108). As print jobs come into the memory (104, 120), the CPU 102 processes the print jobs in accordance with the computer instructions (software) stored in ROM 108.

In the method of the present invention several print jobs may arrive and be stored in the memory (104, 120). The CPU 102 processes the print jobs under control of the software. In accordance with the present teachings, the CPU 102 executes the computer instructions and reorganizes the priority or order of the print jobs.

Figure 2:
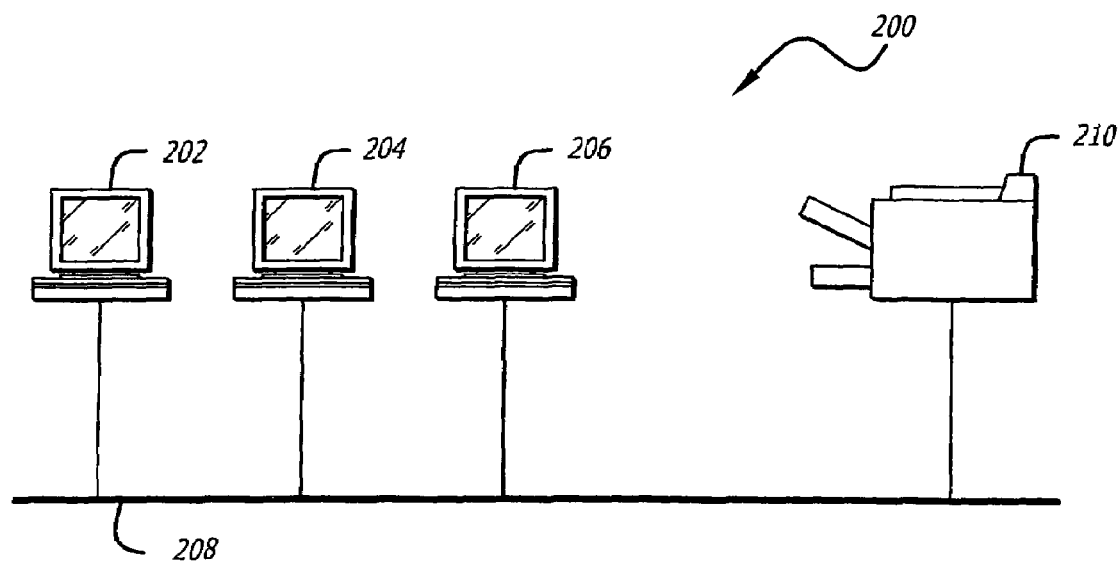
FIG. 2 is a conceptual drawing of a network implementing the method and apparatus of the present invention.

FIG. 2 shows a Local Area Network 200 adapted to utilize the teachings of the present invention. It should be appreciated that a printer implementing the teachings of the present invention may be a shared printer of any type regardless of whether the printer is shared across a network (e.g. Local Area Network or internet) or if the printer is shared as a result of a direct connection to several end-users.

In FIG. 2 computers 202, 204 and 206 communicate across a shared communications path 108 with a shared printer 100 such as that shown in FIG. 1. The computers 202, 204, 206 are each independent devices. Each of the computers is capable of sending a print job at any time. The shared printer 100 operates in both an operating mode and a power save mode. In the operating mode the printer 100 is fully functional and power is supplied to the full printer circuitry and apparatus. In operating mode the printer receives print jobs and processes these jobs immediately if there are no print jobs pending. If print jobs are pending the printer stores the print job in memory until the received print job can be printed by the printer apparatus. Placing incoming jobs in memory until printer resources are available for printing creates a queue of print jobs in the memory.

When the printer is in power save mode, the full functionality of the printer is not being utilized. For example, power is applied to a subset of the printer circuitry and apparatus to save energy. When a printer receives a job in power save mode, the printer first powers up the printer circuitry and apparatus that is maintained in a standby or 'sleep' state. This places the printer in operational mode. After the printer is in operational mode, the printer prints the job as mentioned above.

Figure 3:
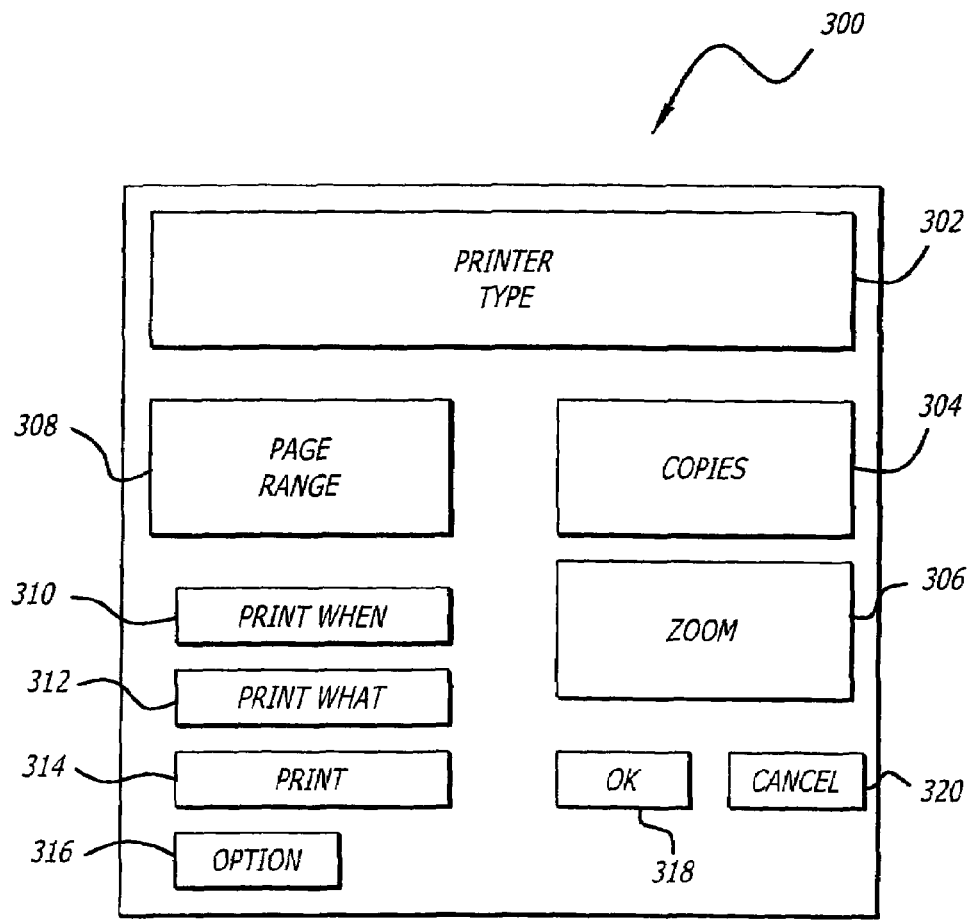
FIG. 3 is a graphical user interface of a print control screen.

FIG. 3 displays a modified graphical user interface 300 used to print documents in accordance with the inventive method. In FIG. 3 a printer type field is shown as 302. The printer type field enables an end-user to select a specific printer and change details about how the document should be printed. For example, the landscape or portrait option may be selected. A copies field is also shown as 304. The copies field 304 enables an end-user to specify or request a number of copies. A zoom field is shown as 306. The zoom field 306 enables an end-user to scale the size of the print job. A page range field 308 is shown. The page range field 308 enables an end-user to print the current page, selected pages or all the pages of a print job.

A "print when" field is shown at 310. In accordance with the present teachings, the "print when" field 310 enables the end-users to put a time requirement on the print job. For example, the end-user may be given a choice of zero seconds before printing, fifteen seconds before printing or thirty seconds before printing. In accordance with the present invention, once the user selects a "print when" designation, the print job is assigned a priority code at the end-user location and sent out to the printer. Selecting a "print when" option attaches a set of printer commands to the print job. The printer commands are sent with the print job to the printer. When the printer receives the print job, the printer interprets and processes the printer commands with the other printer command (e.g. number of copies) and processes the job accordingly.

A "print what" field 312 and a print field 314 are also shown. These two fields enable the end-user to print specific documents. An option field 316 enables an end-user to specify specific printing options. Once all the print selections have been made an OK field 318 and a cancel field 320 may be utilized. These fields enable the end-user to print the job or cancel the printing of the job.

Figure 4:
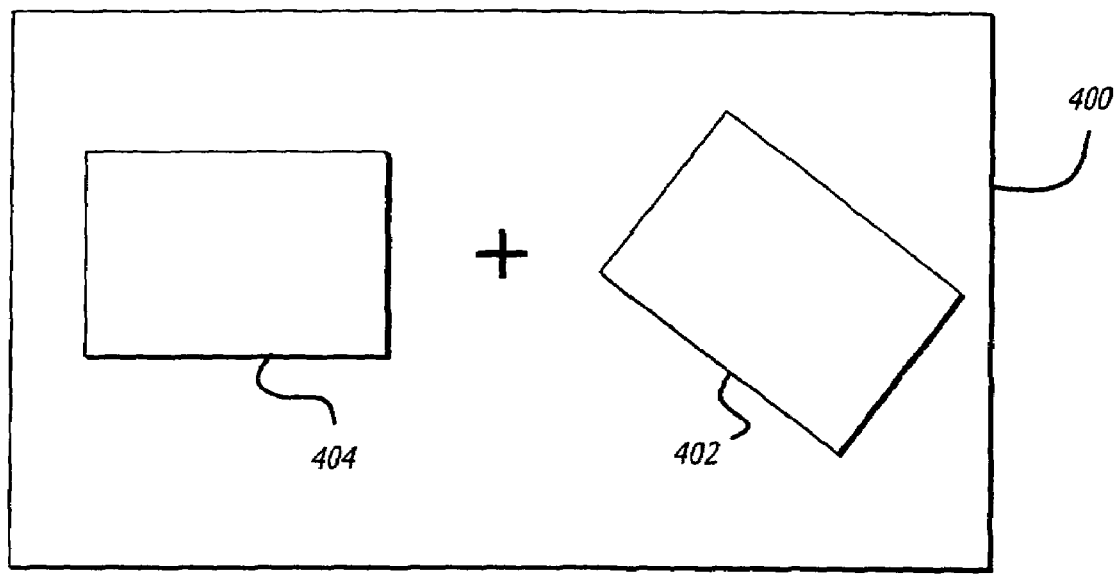
FIG. 4 is a conceptual drawing of the system setup of the present invention.

FIG. 4 displays a conceptual drawing 400 of the components of the presenting invention. In FIG. 4 additional instructions 402 are added to the firmware and the memory of a printer, represented by 404. The firmware includes the logic that the printer uses to process print jobs as the jobs come into the printer.

In accordance with the present teachings, additional firmware for reading and processing a priority code attached to each print job is provided. In addition, a priority code lookup table is stored in the printer memory and used in conjunction with the firmware instructions. For example, a job may arrive at the printer with priority code 2. The firmware will read-in the priority code '2' and then access the priority code table stored in the printer memory. Based on where the priority code of 2 is located in the priority code table, the firmware instructions will then process the job based on the predefined instructions stored in the firmware.

In accordance with the method of the present invention, the printer may follow a series of firmware logic steps and perform a number of activities to process a print job. For example, the printing priority may be based on the number of pages required to be printed. The logic may be established so that pages with a smaller number of pages are always printed first. Alternatively, the printing priority may be based on the time that the print job is required by the end-user. Therefore, the print jobs may be prioritized and printed based on when the end-user plans to pick up the print job from the printer. The priority may also be based on a combination of the two, such that the jobs are printed based on both the number of sheets in the print job and the time that the print job is required. It should be appreciated that a number of priority schemes may be implemented. For example, priority schemes may be based on individual users or class of users or priority schemes may be based on the type of job being printed.

Figure 5:
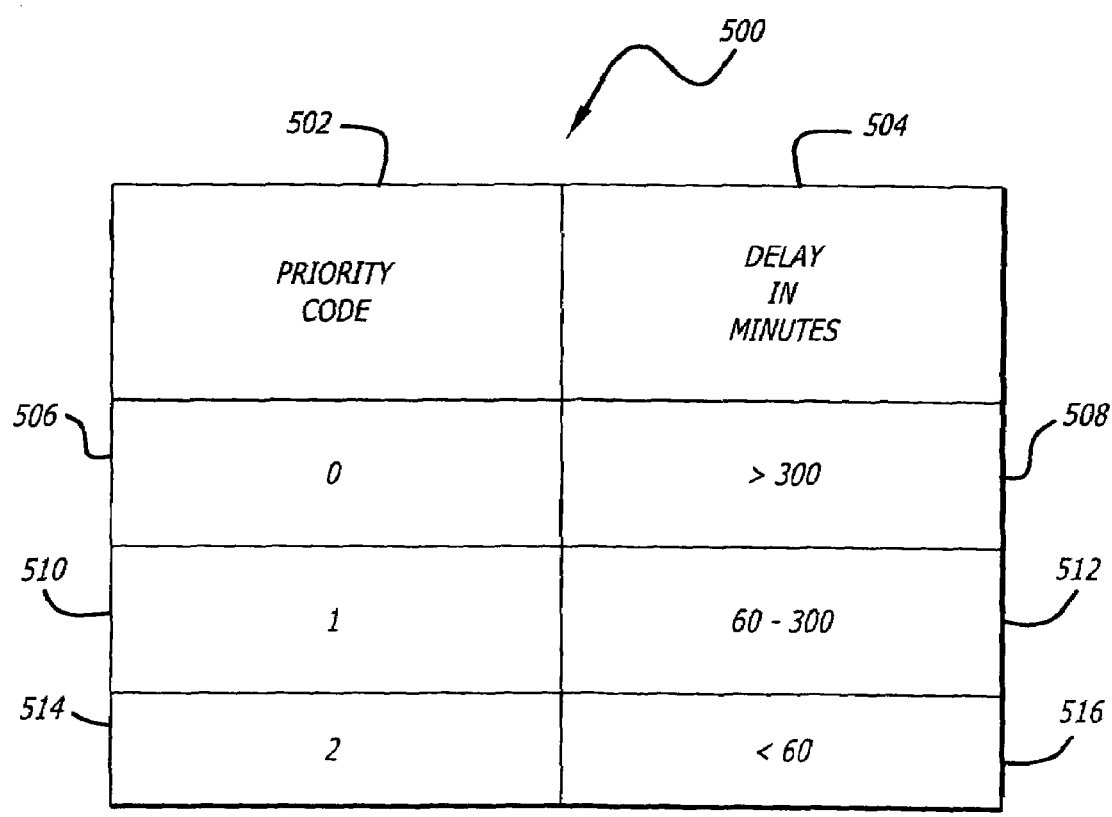
FIG. 5 is a priority code table implemented utilized in the method and apparatus of the present invention.

FIG. 5 displays a priority code table 500 adapted for use in accordance with an illustrative implementation of the teachings of the present invention. In the present invention, the priority code table is stored in the printer memory and accessed based on the logic that is hard coded into the printer firmware. However, it should be appreciated that the priority code table or the firmware instructions may be stored in another memory, may be hard coded, soft coded or downloadable software that can be updated.

The priority code table 500 includes a priority code column 502 and a delay column 504. The priority code column includes a predefined set of priority codes. The predefined set of priority codes may be any codes defined by the user. The delay column includes the time delay before printing. The time delay values may be values based on any time scheme and separated by predefined intervals. For example, the delay may be in seconds, minutes or hours.

Each priority code is associated with a delay. For example, priority code zero as shown in 506 is associated with a delay of more than three hundred minutes as shown at 508. Priority code 1 as shown at 510 is associated with a time delay of between sixty and three hundred minutes as shown at 512. Priority code 2 as shown at 414 is associated with a time delay that is less than sixty as shown at 516.

In the method of the present invention, the time delay 508, 512 and 516 is selected by the end-user. The print job is then coded with a priority code and sent to the printer. At the printer, the firmware instructions are followed to process the priority code by reading the corresponding time delay in the priority code lookup table 500. The print job is then processed consistent with the method of the present invention.

Figure 6:
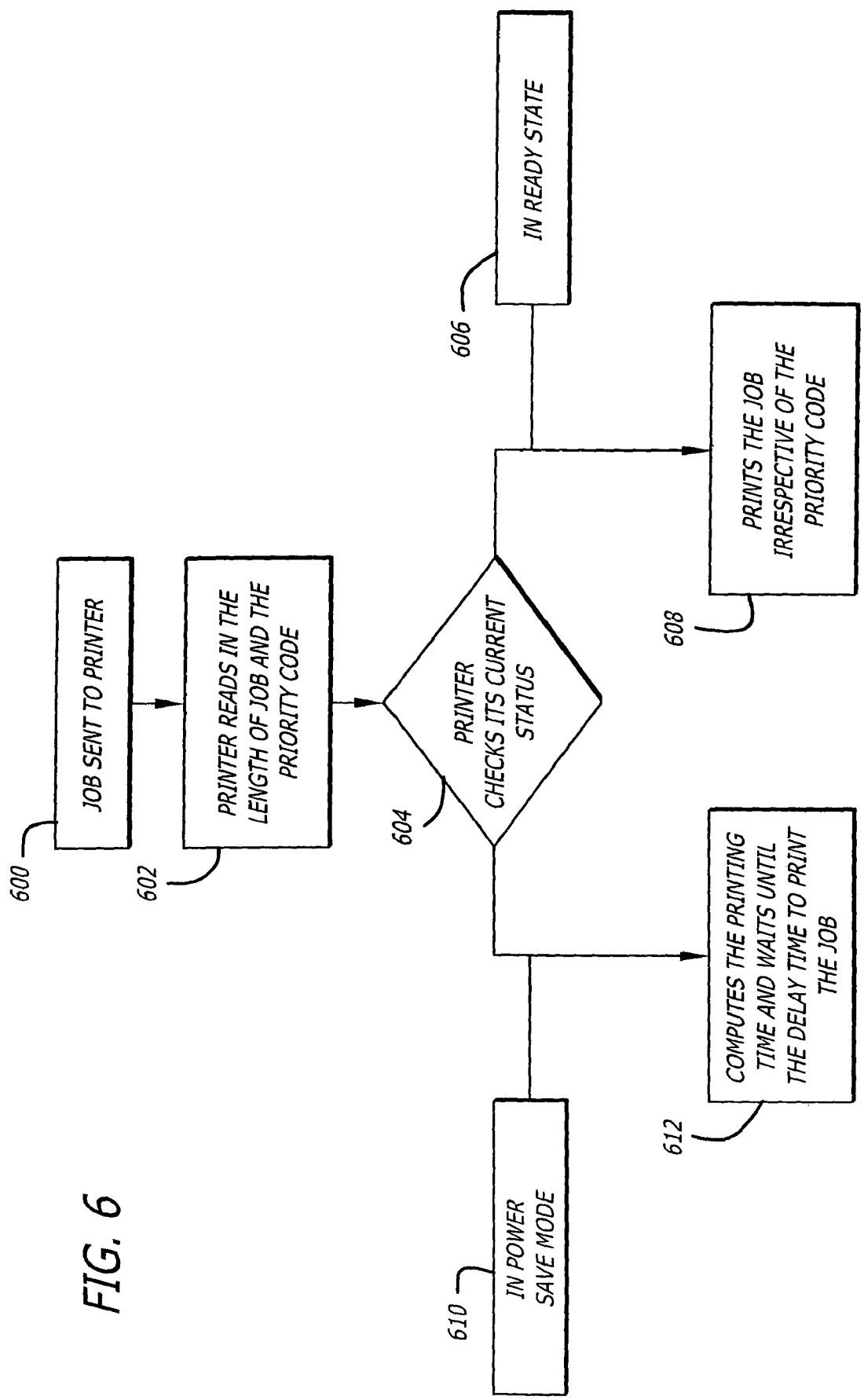
FIG. 6 is a flow diagram of the method of the present invention.

FIG. 6 displays the methodology of the present invention. A job is sent to the printer with priority information coupled to it as shown at 600. The printer then reads the length of the job (e.g. number of pages) and the priority code. The printer uses a lookup table, such as the lookup table 500 of FIG. 5, to determine the amount of time that the job can be delayed before printing, as shown at 602. The printer checks the current status (e.g. operational mode or power save mode) as shown at 604. If the printer is in the ready state as shown at 606 the job is printed irrespective of the priority code as shown at 608. If the printer is not in the ready state, but in power save mode as shown at 610, the printer analyzes the length of job and priority code input, to determine when the job should be printed as shown at 612.

In the methodology of the present invention, the printer computes the printing time based on the number of pages and waits until the delay time is less than the printing time to print the job. During this time the job is stored in the printer memory. If another print job with a higher priority code or any other job that is already in memory needs to be printed thereby bringing the printer to ready state, then all the jobs are printed irrespective of the priority code. For example, if a job was already in memory and then a job with a higher priority is subsequently stored in the memory, all the jobs in the memory will be printed when the higher priority job is printed. In addition, if a job that was already in memory reaches a point where it is time to print that job, then all of the jobs are printed irrespective of the priority code.

As an alternative to printing all the jobs in memory when one job reaches its printing time, it is possible with the method of the present invention, to reorder the printing of jobs and only print the specific job that has reached its printing time.

Furthermore, when prioritizing jobs based on classes or categories, with the method of the present invention, it is possible to reorder and print certain classes or categories of jobs before others.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of printing comprising:
   receiving at a printer a job to be printed including length of job information and priority code information;
   checking printer status for power save mode or for ready state;
   if in power save mode when the job is received, computing a printing time of the received job based at least in part on the length of job information, and determining an amount of time that the received job can be delayed before printing based at least in part on the priority code information so as to maintain the printer in the power save mode for a longer time; and
   if in ready state when the job is received, printing the received job.

2. The invention of claim 1 wherein said length of job information is number of pages.

3. The invention of claim 1 wherein the determining the amount of time that the job can be delayed before printing further includes reading a lookup table.

4. The invention of claim 1 further including computing the printing time based on the number of pages.

5. The invention of claim 1 further including waiting until the job delay time is less than the printing time to print the job.

6. The invention of claim 5 wherein the step of waiting until the job delay time is less than the printing time to print the job further includes the step of storing the job in memory.

7. The invention of claim 6 further including the step of printing a pending job irrespective of the priority code thereof if the pending job is another print job with a higher priority code whereby if a job was already in memory and then a job with a higher priority is subsequently stored in the memory, all the jobs in the memory will be printed when the higher priority job is printed.

8. The invention of claim 6 further including the step of printing a pending job irrespective of the priority code thereof if the pending job is another print job in memory that needs to be printed, whereby if a job that was already in memory reaches a point where it is time to print that job, then all of the jobs are printed irrespective of the priority code.

9. The invention of claim 1 wherein said priority code information includes at least one of class information or category information.

10. The invention of claim 9 further including:
    ordering a plurality of pending jobs based on at least one of the class information or category information.

11. A printing system comprising:
    means for receiving at a printer a job to be printed including length of job information and priority code information;
    means for checking printer status for power save mode or for ready state;
    means for computing a printing time of the received job based at least in part on the length of job information, and determining an amount of time that the received job can be delayed before printing based at least in part on the priority code information so as to maintain the printer in the power save mode in response to the power save mode being detected; and
    means for printing the received job if the ready state is detected.

12. The invention of claim 11 wherein said length of job information is number of pages.

13. The invention of claim 11 further including means for determining the amount of time that the job can be delayed before printing.

14. The invention of claim 13 wherein the means for determining the amount of time that the job can be delayed before printing further includes a lookup table and means for reading a lookup table.

15. The invention of claim 13 further including means for computing the printing time based on the number of pages.

16. The invention of claim 14 further including means for waiting until the job delay time is less than the printing time to print the job.

17. The invention of claim 16 wherein the means for waiting until the job delay time is less than the printing time to print the job further includes means for storing the job in memory.

18. The invention of claim 17 further including means for printing a pending jobs irrespective of the priority code thereof if the pending job is another print job with a higher priority code whereby if a job was already in memory and then a job with a higher priority is subsequently stored in the memory, all the jobs in the memory will be printed when the higher priority job is printed.

19. The invention of claim 17 further including means for printing a pending job irrespective of the priority code thereof if the pending job is another print job in memory that needs to be printed, whereby if a job that was already in memory reaches a point where it is time to print that job, then all of the jobs are printed irrespective of the priority code.

20. The invention of claim 11 wherein said priority code information includes class information.

21. The invention of claim 11 wherein said priority code information includes category information.

22. A printer, comprising:

an input interface configured to receive a print job including a priority code indicative of a time requirement for printing the print job;

logic configured to determine if the printer is in a power save mode; and logic configured, when the printer is in the power save mode, to determine an amount of time that the print job can be delayed before printing based at least in part on the priority code, so as to maintain the printer in the power save mode for a longer time.

23. The printer of claim 22, comprising:

logic configured to wait until the job delay time is less than the printing time, and then to print the print job.

24. The printer of claim 22, comprising:

logic configured to print the print job without a delay if the printer is not in the power save mode.

25. The printer of claim 22, wherein the time requirement is a time that the print job is required by a user.

26. The printer of claim 22, wherein the print job further includes length of job information, further comprising:

logic configured, when the printer is in the power save mode, to compute a printing time of the print job based at least in part on the length of job information.

27. The printer of claim 26, wherein the amount of time that the print job can be delayed before printing is based on the priority code and the printing time.

* * * * *

UNITED STATES PATENT AND TRADEMARK OFFICE
CERTIFICATE OF CORRECTION

PATENT NO.        : 7,072,053 B2                                    Page 1 of 1
APPLICATION NO. : 10/611072
DATED             : July 4, 2006
INVENTOR(S)       : Srinivas Guddanti It is certified that error appears in the above-identified patent and that said Letters Patent is hereby corrected as shown below:

In column 6, line 21, in Claim 3, after "wherein" delete "the".

In column 7, line 20, in Claim 18, delete "jobs" and insert -- job --, therefor.

Signed and Sealed this

Third Day of March, 2009

JOHN DOLL
*Acting Director of the United States Patent and Trademark Office*